Feb. 4, 1969 — E. ROEMER — 3,425,112
MANUFACTURE OF JOURNAL BEARINGS
Filed Oct. 3, 1966
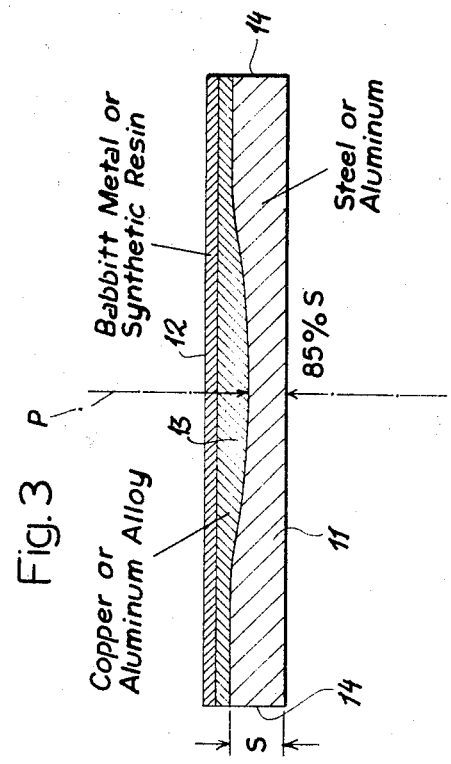
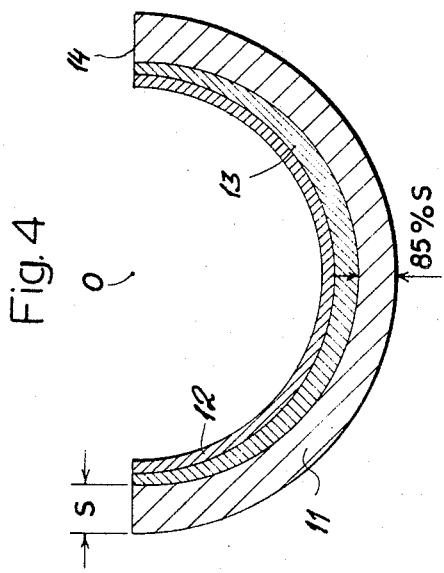
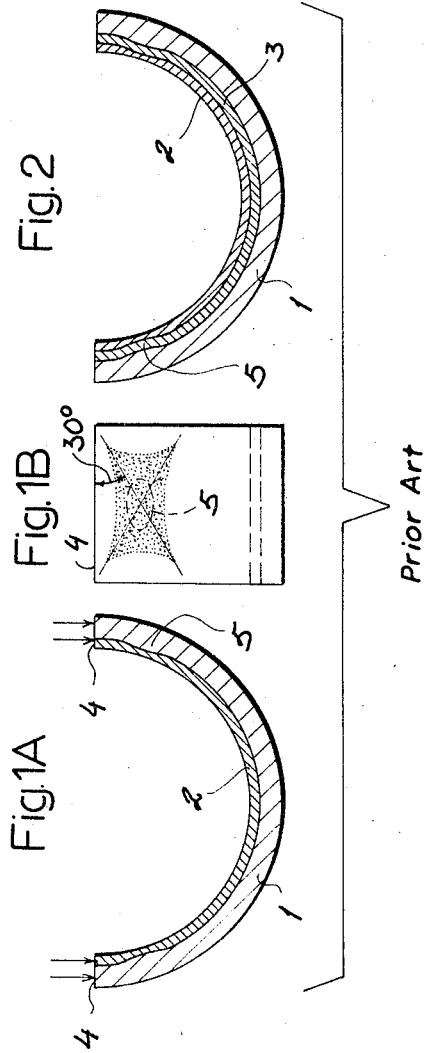
Erich Roemer
INVENTOR.
BY Karl F. Ross
Attorney

United States Patent Office 3,425,112
Patented Feb. 4, 1969

3,425,112
MANUFACTURE OF JOURNAL BEARINGS
Erich Roemer, Wiesbaden, Germany, assignor to Glyco-Metall-Werke, Daelen & Loos G.m.b.H., Wiesbaden-Schierstein, Germany, a corporation of Germany
Filed Oct. 3, 1966, Ser. No. 583,553
Claims priority, application Germany, Oct. 2, 1965,
G 44,850
U.S. Cl. 29—149.5    11 Claims
Int. Cl. B21d 53/10; F16c 9/00, 33/00

My present invention relates to the manufacture of journal bearings from blanks in the form of composite strips which are deformed, e.g. in a drop-forging press, into arcuate (e.g. semicylindrical) shape.

It is customary to make such strips from a plurality of superposed layers, including a relatively heavy backing layer of hard metal, such as steel or aluminum, and a relatively soft lining material which in use comes into contact with the shaft or other element to be rotatably supported thereby. The service life of such bearings, particularly those designed for heavy duty in internal-combustion engines and the like, varies generally inversely with the thickness of the lining which, therefore, ought to be as thin as is technically feasible. The lining of uniform thickness, e.g. from 0.02 to 0.05 mm. can be deposited galvanically from a plating bath; this method, however, requires a separate operation after deformation of the backing layer and, in addition, is unsuitable for certain materials (e.g. polymers such as Teflon and epoxy resins) which are becoming increasingly important as antifriction bearing liners. The bending of a bearing member from a composite blank, followed by final machining of the lining to the desired tolerances, is thus of more universal applicability and considerably more economical. This procedure, however, is not free from drawbacks inasmuch as the deformation of a composite strip in a drop-forging press or the like gives rise to nonradial—especially tangential—stresses which lead to a local bulging of the backing layer with consequent displacement and weakening of the thin lining so that, in extreme situations, the lining may rupture and expose the underlying high-friction metal body.

There have been attempts to avoid this bulging of the backing layer by initially reducing the thickness of that layer at the locations subject to tangential stresses, yet this approach has been unsuccessful because the resulting nonuniformiy of strip thickness creates difficulties in forging and also tends to produce secondary stresses with consequent dislocation of the lining material. This difficulty is not obviated by the interposition of a third layer, of intermediate hardness, between the backing layer and the lining.

It is, therefore, the general object of my invention to provide an improved method of making journal bearings from composite strips by drop forging or similar processes, with avoidance of the aforestated disadvantages.

A related object is to provide an improved blank of the composite-strip type adapted to be used in such process.

I have found, in accordance with this invention, that the inconveniences referred to can be remedied by the step of varying the mean hardness of the composite strip, as averaged over its thickness, prior to its deformation and in such a sense that a zone of maximum mean hardness occurs at a location subject to maximum tangential stresses during the deformation step.

Since the variation in mean hardness is independent of strip thickness, no departure from optimum design dimensions is necessary and no objectionable discontinuities will occur. Thus, where a true cylinder surface is desired, a uniform thickness of the composite sheet material can be maintained throughout; if the bearing surface is to be curved in an axial plane, the thickness may vary from one cross-section to another but will be substantially constant within each cross-section.

There are various ways in which the required variation of mean hardness can be realized. One possibility is selective densification of the backing layer itself, with an initial profiling of the strip (e.g. by rolling) to increase the thickness of the portions to be densified, followed by a heating and compaction (again by rolling) of these portions so that the final sheet structure has the desired uniformity of thickness (at least within each cross-section) but is denser and therefore firmer at the portions thus treated; similar results may be achieved by selectively heating those portions of the strip (e.g. a median zone) which are to be less dense.

In accordance with a preferred mode of realization, however, I provide an additional layer of intermediate hardness between the backing layer and the lining, this additional layer advantageously consisting of an alloy of copper (e.g. lead bronze) or aluminum. In order to vary the mean hardness of the composite strip throughout its cross-section, while maintaining the thickness of the lining as uniform as possible (e.g. at 0.1 mm. or less), I change the thickness of the backing layer and complementarily change the thickness of the additional layer so that the bimetallic structure defined by these two layers has a substantially constant thickness throughout in any transverse plane. This bimetallic sheet can then be coated with the lining which may consist of the usual bearing alloys, such as Babbitt metal, or a polymeric material as noted above.

The above and other features of my invention will be described in greater detail with reference to the accompanying drawing in which:

FIGS. 1A and 1B illustrate, in cross-section and in side elevation, respectively, a semicylindrical bearing shell formed from a two-layer strip by conventional drop forging;

FIG. 2 is a view similar to FIG. 1A, showing the prior-art procedure as applied to a three-layer strip;

FIG. 3 is a cross-sectional view of a composite three-layer strip adapted to serve as a blank for making a bearing shell in accordance with my invention; and FIG. 4 is a cross-sectional view of a shell formed from the blank of FIG. 3.

In FIGS. 1A and 1B I have illustrated a bearing shell with a backing layer 1, e.g. of sheet steel, and a considerably thinner lining 2, e.g. of Babbitt metal. When the shell 1, 2 is forged from a flat composite strip, a certain amount of pressure is unavoidably exerted upon the lateral edges 4 as indicated by the arrows in FIG. 1A. This pressure results in a thickening of the steel layer 5 against the softer layer 2 which, being inwardly restrained by the male forging die (not shown), yields tangentially so as to form two weak spots 5 somewhat below the edges 4. As will be apparent from FIG. 1B, the spots 5 are localized (lying here at the intersection of two diagonals which include an angle of approximately 30° with the horizontal) so that compensation by an inverse preshaping of layer 1 would be difficult and could not be accomplished by profiling.

As illustrated in FIG. 2, the same type of deformation 5 occurs when another layer 3 of intermediate hardness, e.g. of lead bronze, is interposed between the layers 1 and 2.

In FIG. 3 I have shown a composite strip according to the invention, consisting of a hard backing layer 11 (e.g. of steel or aluminum), a much thinner lining 12 of Babbitt metal, Teflon, epoxy resin or other relatively soft antifriction material, and a compensating layer 13 of lead bronze or some other suitable alloy, of intermediate hardness, disposed between layers 11 and 12. The thickness of the bimetallic structure 11, 13 is constant, yet its constituent layer 11 progressively increases in thickness from a median plane P toward the lateral edges 14 while the compensating layer 13 grows complementarily thinner. When the strip 11–13 is subsequently deformed into semicylindrical shape as shown in FIG. 4, with an axis O located in the median plane P, it is surprisingly found that the tangential stresses of forging do not give rise to bulges of layer 11 and corresponding weak spots of layer 12 as in the prior-art structures shown in the preceding figures. This phenomenon is readily explainable by the fact that the mean hardness of the bimetallic structure 11, 13, as averaged over its thickness, is greater in the vicinity of the edges 14 than near the plane P where its harder constituent 11 occupies a lesser fraction of its cross-section; the term "mean hardness" will be understood to be expressible as the sum of the hardnesses of layers 11 and 13 each multiplied by the ratio of the corresponding layer thickness to the thickness of the bimetal.

The variation in the thickness of backing layer 11 may range between 3 and 30% in a semicylindrical structure as shown in FIG. 3. For best results, particularly with layers 11 and 13 of steel and lead bronze, respectively, I prefer to make the center thickness of layer 11 approximately equal to 85% of the maximum thickness S of that layer at the edges, this representing a thickness variation of about 15%.

The bimetallic structure 11, 13 of FIG. 3 may be produced by first rolling the layer 11 to the illustrated centrally reduced profile and thereafter casting the layer 13 over it; the molten lead bronze has a temperature above 1000° C. which exerts an advantageous annealing effect upon the underlying steel layer 11 to release any stresses due to the rolling operation. If the layer 13 is applied by some other high-temperature method, such as sintering or hot rolling, layer 11 may also be satisfactorily annealed thereby; otherwise, a separate heating step is recommended for this purpose.

It will be understood that the composite strip may extend beyond the boundaries 14 in FIG. 3 so that several blanks for the formation of a plurality of bearing shells may be cut therefrom; the zone of minimum thickness of layer 11 will then be located at the median plane P of each blank. Also, if desired, additional layers of suitable physical characteristics may be inserted between layers 11, 13 and/or between layers 10, 13. These and other modifications, readily apparent to persons skilled in the art, are intended to be embraced in the spirit and scope of my invention as defined in the appended claims.

I claim:

1. In a method of making journal bearings by the deformation of a composite strip into arcuate shape, said strip consisting of a plurality of dissimilar layers including a relatively heavy layer of a harder backing metal and a relatively thin layer of a softer lining material, the improvement which comprises the step of varying the mean hardness of said strip averaged over its thickness, prior to deformation, in a direction which upon deformation becomes the periphery of the bearing, with formation of a zone of maximum mean hardness at a location subject to maximum tangential pressures during deformation, while keeping the thickness of said thin layer substantially constant.

2. The improvement defined in claim 1 wherein the strip, prior to being deformed by bending into semicylindrical shape about an axis, is given its minimum mean hardness in a median axial plane, with progressive increase in hardness toward the lateral edges of the strip.

3. The improvement defined in claim 1 wherein the variation in mean hardness is accomplished by changing the thickness of said heavy layer and interposing a further layer of intermediate hardness and complementarily varying thickness between said heavy layer and said thin layer.

4. The improvement defined in claim 3 wherein the change in thickness of said heavy layer is carried out by subjecting said heavy layer to a profiling operation before applying said further layer and said thin layer thereto.

5. The improvement defined in claim 4 wherein said heavy layer is subjected to an annealing treatment after profiling and prior to deformation into arcuate shape.

6. A composite strip adapted to be arcuately deformed about an axis to form part of a substantially cylindrical journal bearing, comprising a relatively heavy backing layer of a hard metal with a thickness increasing progressively from a median line toward lateral edges parallel to said line, a compensating metal layer of intermediate hardness and substantially complementary thickness variations overlying said backing layer whereby a bimetallic structure with cross-sections of substantially constant thickness is formed, and a relatively soft lining of uniform thickness on said compensating layer.

7. A strip as defined in claim 6 wherein said backing layer consists of steel, and said compensating layer consists of an alloy of copper or aluminum.

8. A strip as defined in claim 7 wherein the thickness variation of said backing layer lies in a range of 3 to 30%.

9. A strip as defined in claim 8 wherein the thickness of said backing layer along said median line is substantially 85% of its thickness at said lateral edges.

10. A strip as defined in claim 6 wherein said lining consists of polymeric material.

11. A strip as defined in claim 6 wherein said lining consists of Babbitt metal.

References Cited

UNITED STATES PATENTS

| | | | |
|---|---|---|---|
| 2,289,311 | 7/1942 | Wellman | 29—191.2 X |
| 2,338,858 | 1/1944 | Lignian | 29—149.5 |
| 3,249,391 | 5/1966 | De Hart et al. | 308—237 |
| 3,251,119 | 5/1966 | Kingsbury et al. | 29—149.5 |
| 3,361,502 | 1/1968 | Weinkamer et al. | 308—237 |

THOMAS S. EAGER, Primary Examiner.

U.S. Cl. X.R.

29—191.2; 308—237